US007917751B2

(12) United States Patent
Keohane et al.

(10) Patent No.: US 7,917,751 B2
(45) Date of Patent: Mar. 29, 2011

(54) DISTRIBUTED FILESYSTEM NETWORK SECURITY EXTENSION

(75) Inventors: Susan Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 10/443,675

(22) Filed: May 22, 2003

(65) Prior Publication Data
US 2004/0236745 A1    Nov. 25, 2004

(51) Int. Cl.
*G06F 21/00* (2006.01)
*G06F 21/24* (2006.01)
*H04L 9/00* (2006.01)

(52) U.S. Cl. ............ 713/165; 713/153; 726/11; 726/13; 726/30

(58) Field of Classification Search .................. 726/2, 3, 726/4, 21, 26, 27
See application file for complete search history.

(56) References Cited

U.S. PATENT DOCUMENTS

| 5,758,334 | A |   | 5/1998  | Knight, III et al. |        |
|-----------|---|---|---------|--------------------|--------|
| 5,903,732 | A | * | 5/1999  | Reed et al.        | 709/229|
| 5,931,947 | A | * | 8/1999  | Burns et al.       | 726/4  |
| 6,006,018 | A | * | 12/1999 | Burnett et al.     | 709/219|
| 6,289,462 | B1| * | 9/2001  | McNabb et al.      | 726/21 |
| 6,385,625 | B1| * | 5/2002  | Slaughter          | 707/201|
| 6,405,315 | B1| * | 6/2002  | Burns et al.       | 713/190|
| 6,678,828 | B1| * | 1/2004  | Pham et al.        | 726/2  |
| 6,772,333 | B1| * | 8/2004  | Brendel            | 713/153|
| 6,782,418 | B1| * | 8/2004  | Cerrone et al.     | 709/217|
| 6,850,252 | B1| * | 2/2005  | Hoffberg           | 715/716|

(Continued)

FOREIGN PATENT DOCUMENTS
JP    09-305682    11/1997

(Continued)

OTHER PUBLICATIONS

Keith Brown, "Web Security: Putting a Secure Front End on Your COM+ Distributed Application" MSDN Magazine, Apr. 4, 2003, http://web.archive.org/web/20030404014033/http://msdn.microsoft.com/msdnmag/issues/0600/websecure/default.aspx>.

(Continued)

*Primary Examiner* — Michael Pyzocha
*Assistant Examiner* — Jeffery Williams
(74) *Attorney, Agent, or Firm* — Dillon & Yudell LLP

(57) ABSTRACT

A security protocol that dynamically implements enhanced mount security of a filesystem when access to sensitive files on a networked filesystem is requested. When the user of a client system attempts to access a specially-tagged sensitive file, the server hosting the filesystem executes a software code that terminates the current mount and re-configures the server ports to accept a re-mount from the client via a more secure port. The server re-configured server port is provided the IP address of the client and matches the IP address during the re-mount operation. The switch to a secure mount is completed in a seamless manner so that authorized users are allowed to access sensitive files without bogging down the server with costly encryption and other resource-intensive security features. No significant delay is experienced by the user, while the sensitive file is shielded from un-authorized capture during transmission to the client system.

15 Claims, 6 Drawing Sheets

U.S. PATENT DOCUMENTS

| | | | | |
|---|---|---|---|---|
| 6,931,530 | B2* | 8/2005 | Pham et al. | 713/165 |
| 6,947,556 | B1* | 9/2005 | Matyas et al. | 380/29 |
| 7,010,689 | B1* | 3/2006 | Matyas et al. | 713/168 |
| 7,073,055 | B1* | 7/2006 | Freed et al. | 713/155 |
| 7,089,585 | B1* | 8/2006 | Dharmarajan | 726/8 |
| 2002/0104022 | A1* | 8/2002 | Jorgenson | 713/201 |
| 2004/0015723 | A1* | 1/2004 | Pham et al. | 713/201 |
| 2004/0078568 | A1* | 4/2004 | Pham et al. | 713/165 |
| 2004/0216150 | A1* | 10/2004 | Scheifler et al. | 719/330 |
| 2005/0114712 | A1* | 5/2005 | Devine et al. | 713/201 |
| 2006/0053481 | A1* | 3/2006 | Olsen et al. | 726/3 |
| 2006/0106866 | A1* | 5/2006 | Green et al. | 707/104.1 |

FOREIGN PATENT DOCUMENTS

| | | |
|---|---|---|
| JP | 10-124427 | 5/1998 |
| JP | 10-171879 | 6/1998 |
| JP | 10-229459 | 8/1998 |
| JP | 2000-010921 | 1/2000 |
| JP | 2000-067120 | 3/2000 |
| JP | 2000-076336 | 3/2000 |

OTHER PUBLICATIONS

"PHP Course: Redirection" Apr. 23, 2003, http://we.archive.org/web/20030423074148/http://hypermedic/com/php/redirect.htm>.

David Robinson, Apache Software Foundation: "The Common Gateway Interface (CGI) Version 1.1" Internet Draft, Apr. 16, 2003.

Blaze Matt: "Cryptographic File System for Unix" ACM Conference on Computer and Communications Security, Nov. 3, 1993, pp. 19-16.

O'Connell M., et al.: "JFS: A secure Distributed File System for Network Computers" Euromicro Conference, 1999. Proceedings 25th Milan, Italy, Sep. 8, 1999, pp. 450-457, ISBN: 0-7695-0321-7.

Pawlowski et al., The NFS Version 4 Protocol.

European Patent Office, Notification of Transmittal of the International Preliminary Report on Patentability, Aug. 30, 2005.

European Patent Office, "Notification of Transmittal of the International Search Report and the Written Opinion of the International Searching Authority, or the Declaration", Jul. 29, 2004.

AUS920030048JP1, Notice of Reasons for Rejection, JPO, Dispatch No. 297075, Apr. 27, 2010.

* cited by examiner

DISTRIBUTED FILESYSTEM NETWORK SECURITY EXTENSION

BACKGROUND OF THE INVENTION

1. Technical Field

The present invention relates in general to network systems and in particular to distributed filesystems. Still more particularly, the present invention relates to security features for access to distributed filesystems.

2. Description of the Related Art

In general purpose computing systems, such as those supporting versions of the Unix operating system (OS), applications may access data stored on disk drives by means of a set of operating system services including a filesystem. A filesystem may be employed by a computer system to organize a large collection of files into individual files and directories of files and to map those files to storage devices such as disks. Filesystems comprise two primary components, the programs that control the physical representation of the files and the files themselves that are stored on the disk.

In a distributed computing environment, a number of computing systems can be interconnected by way of a communication network or other coupling facility and can share files by way of a distributed filesystem. A filesystem exporter is typically executed on the server node (the computing system that controls access to the disk containing the filesystem data), while a filesystem importer is typically executed on the client nodes (other computing systems utilized to access the files on the disk). Accesses to shared files by users on the client nodes are referred to as "remote" accesses. Accesses to shared files made by users on the server node are referred to as "local" accesses.

The network filesystem is stored on a server or node of a network, and the server or node is accessible from client terminals (i.e., user computers) that are typically remotely linked to the network. The actual link may be a wired link, as in a standard Ethernet-based local area network (LAN) or a wireless link, such as a Bluetooth Virtual Private Network (VPN). The process of accessing the filesystem via the client terminals is referred to as "mounting a filesystem." When a filesystem is mounted, the filesystem's control program reads certain information from the disk concerning the layout of filesystem objects. From this information, the filesystem constructs data structures known as "virtual filesystems" or Vfs's. Each time a file is opened, or made accessible, the filesystem creates a data structure, referred to as a "vnode", which is chained to the vfs.

Each vnode contains information about a given file and contains references to physical file system data structures. The physical file system data structures contain information such as the owner of the file, the size of the file, the date and time of the file's creation and the location of the blocks of the file on the disk. Filesystems include internal data, called meta-data, to manage files. Meta-data may include data that indicates: where each data block of a file is stored; where memory-modified versions of a file are stored; and the permissions and owners of a file.

With more and more companies using remote/network-accessible distributed filesystems to electronically store and later retrieve files/documents, including some with sensitive information, security of distributed filesystems is becoming increasingly important. The IP Security (IPSec) suite of standards was introduced and provides two primary security features: authentication and encryption. In other words, IPSec ensures that sending and receiving machines really are what they claim to be, and IPSec enables data to be scrambled in flight so the data will be incomprehensible if intercepted.

Most systems thus require an authentication of the user during the initial mount, which typically includes verifying user-passwords, etc. However, password-protection and similar security measures are notorious for being open to cracking and can easily be compromised, and the industry has recognized that password-protected systems offer very little protection to sensitive files once general access to the filesystem is obtained.

More advanced hackers also gain access to the files stored on the filesystem by tapping into a transmission during an authorized mount and simply copying the data as it is being transmitted from filesystem to client system. This occurs because, with most password-protected distributed filesystems, once the several levels of security log-in (password verification, etc) are completed, the actual transmission of the files from the filesystem occurs in clear text. Thus, when the transmission includes very sensitive data, additional security measures are required to ensure that the clear text data is not available by simply copying the file during transmission.

The ease at which the security of the sensitive information may be compromised via this latter method depends to some extent on the medium being utilized by authorized users to mount/access the filesystem. For example, wireless access/transmission is typically more prone to eavesdropping and cracking that wire-full (wired) network media. However, even the standard Ethernet can easily be breached without detection, and thus the standard Ethernet is also an unsafe option for routing sensitive data.

As mentioned above, the industry has responded to the growing need for security on the transmission medium by imposing heavy encryption on all transmitted data during a mount of the filesystem. Currently, there are several encryption algorithms and standards (e.g., wireless transport layer security) designed to provide security for the transmissions between client system/node and the server hosting the filesystem. Utilization of heavy encryption requires placing a heavy processing burden on the client system and the server for all traffic. The overall performance of the system is degraded, and significant costs are incurred by companies that wish to implement system-wide encryption for access to their filesystem. Encryption is built into the communication mechanisms and applied to all traffic between client system and server although the majority of traffic may not require that level of security (e.g., non-sensitive information/files).

The utilization of wireless systems to access filesystems is increasing as companies provide remote access to users who may be mobile and wish to connect to the network remotely. Wireless connections are, however, more susceptible to cracking than wired connections. Some wireless users use WTLS, but this security feature is known to be a relatively weak level of security. One solution requires a Virtual Private Network (VPN) data encapsulation/encryption to access sensitive data, even when the majority of clients are accessing the filesystem via token ring. This VPN data encapsulation would further negatively impact the speed of the servers as they encrypt and decrypt all data.

It is also possible to configure VPNs or servers on a VPN to recognize IP addresses or subnets and only require encryption on certain subnets. One problem with this solution is that the administrator of the distributed filesystem server must have knowledge of every wireless node that is not within the network. If a wireless network is set up by an organization within their department, the server administrator would need to be made aware of the wireless network so that the subnet could be added to the VPN list of IP addresses.

In light of the foregoing, the present invention recognizes that it would be desirable to have a method, system and data processing system that dynamically implements enhanced mount security when access to sensitive files on a distributed filesystem is requested. A method and system that would automatically provide a secure mount whenever sensitive file/data are about to be accessed during an ongoing session would be a welcomed improvement. It would be further desirable if the secure mount was completed in a seamless manner so that the authorized user receives access to the sensitive file without experiencing a disconnect and re-mount authentication process, while the sensitive file is shielded from unauthorized capture by routing the sensitive file via the more secure mount.

SUMMARY OF THE INVENTION

Disclosed is a method, system and computer program product that dynamically implements enhanced mount security of a filesystem when access to sensitive files on a networked filesystem is requested. The client system initiates a standard mount and authentication process for access to files of the filesystem. When the user of the client system attempts to access a specially tagged sensitive file, the server executes a software code that terminates the current mount. The server is re-configured to route to a secure port any attempts to re-mount the server from the IP address associated with the client. When a session is terminated by the server, the client system is programmed to automatically attempt to re-mount the server. The server recognizes the IP address of the client during the re-mount operation and routes the client to the secure port.

A secure mount is thus automatically provided whenever sensitive files/data are about to be accessed during an ongoing session that was initiated on a standard mount. Then routing via a secure mount is completed in a seamless manner so that the authorized user receives access to the sensitive file without experiencing significant delay or a visible disconnect that requires user-initiated re-mount and authentication processes. Meanwhile the sensitive file is shielded from unauthorized capture by routing the sensitive file via the more secure mount established.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figures 1A, 1B:
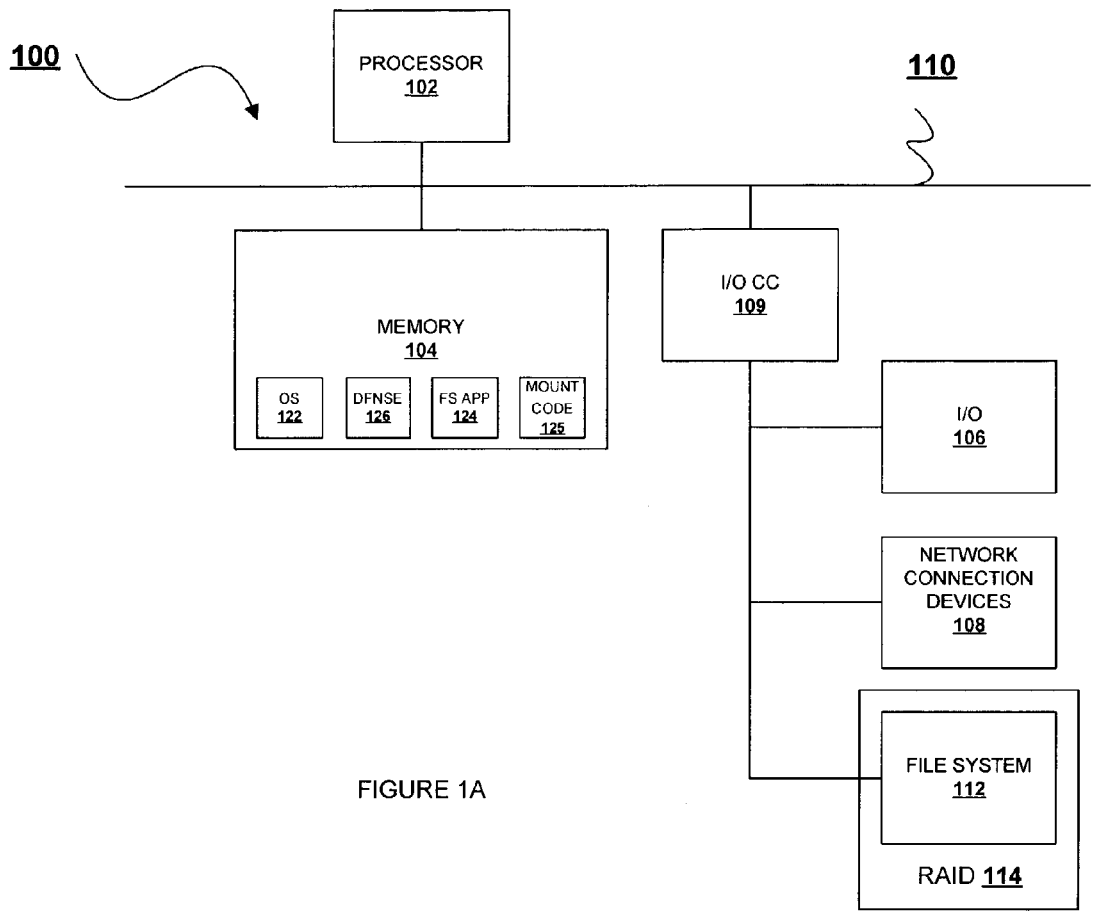
FIG. 1A is a block diagram of a data processing system within which the features of the invention may be implemented.
FIG. 1B is a block diagram representation of the files within the filesystem of FIG. 1A having a security tag indicating a required level of security according to one embodiment of the invention.

With reference now to the figures and in particular with reference to FIG. 1A, there is illustrated a block diagram of a computer system, which may be utilized as either a server hosting the distributed filesystem or a client system utilized to mount the server at which the distributed filesystem is hosted. Computer system 100 comprises processor 102 and memory 104 connected via system bus/interconnect 110. Computer system 100 also comprises Input/Output (I/O) Channel Controller (CC) 109, which is coupled to interconnect 110. I/0 CC 109 provides connection to I/O devices 106, including Redundant Array of Disk (RAID) 114. RAID 114 stores instructions and data that are loaded to memory as needed by the applications being executed by the processor. According to the illustrative embodiment, RAID 114 provides the storage media for the plurality of files that constitute filesystem 112.

Computer system 100 further comprises network connection devices 108, which may include wireline modem, wireless modem, and Ethernet card, among others. Access to and from I/O devices 106 and network connection devices 108 are routed through I/O channel controller (I/OCC) 109, which includes logic for completing the automatic re-establishment of a mount to/from computer system 100 via a "secure" path/channel/port when required, as further described below.

Computer system 100 includes operating system (OS) 122, filesystem software application 124, mount code 125 and DFNSE 126. Filesystem software application 124 provides the basic accessing, maintaining, and updating of filesystem 112, when computer system 100 is being utilized to host a filesystem 112.

When within a client system, filesystem software application 124 includes client version of mount code 125 for completing a mount and automatic re-mount of the server hosting the filesystem. In the illustrative embodiment, the automatic remount process is implemented by the client system whenever an established mount with the server is disrupted/lost without the client having completed an unmount of the server. In the described embodiment, the server may issue a FYN command to terminate a current mount and thus force the client to initiate a re-mount of the server. The FYN command is issued in response to access to particular files that require special security protections, as will be explained in greater detail below.

Returning to FIG. 1A, and the description of filesystem software application 124, when executed within a server, filesystem software application 124 includes code for receiving, maintaining, and verifying credential information of various users and client systems, code for maintaining filesystem 112 and code for selectively initiating a security software and associated response, called Distributed Filesystem Network Security Extension (DFNSE) 126. DFNSE 126 provides the backbone of the inventive features herein and the execution of DFNSE 126 on a server is described below with reference to FIGS. 3A-3C and 4A. At a basic level, DFNSE 126 determines what level of security access is permitted/authorized for specific files of the filesystem 112 and when to initiate the enhanced security measures of the invention.

Figure 2:
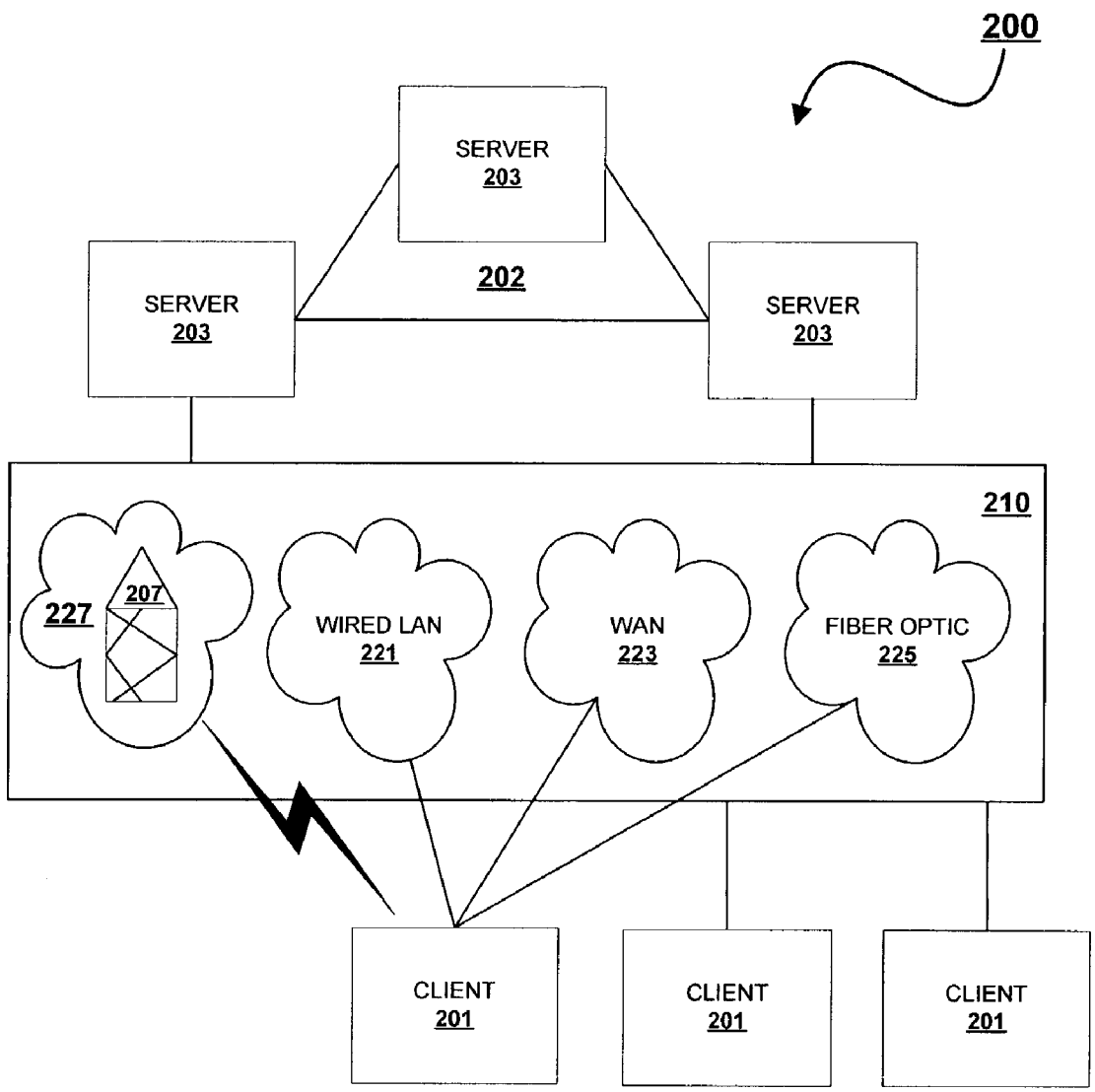
FIG. 2 is a block diagram of a distributed network within which features of the invention may be implemented according to one embodiment of the invention.

With reference now to FIG. 2, there is illustrated an example network comprising multiple interconnected computer systems, which may be similarly configured to computer systems 100 of FIG. 1 that are advantageously utilized to provide either the server or client functionality for respectively hosting or accessing a distributed filesystem. Network 200 comprises a distributed filesystem 202 hosted on three (or more) interconnected servers 203. Network 200 also comprises a plurality of client systems 201 connected to distributed filesystem 202 via a network backbone 210. Network backbone 210 comprises one or more network-connectivity systems (or sub-networks) that may be configured according to network protocols such as Ethernet or TokenRing. These sub-networks may be, for example, wire-line or wireless local area networks (LAN) or a wide area network (WAN), such as the Internet. Additionally, sub-networks may include fiber optic network as well.

Distributed filesystem 202 is directly coupled to network backbone 210 via one or more ports (not shown) on at least one of the servers 203. Client systems 201 may be either directly coupled to the network backbone (wireline) or communicatively connected via a wireless medium illustrated by wireless antenna 207. Client systems 201 access the distributed filesystem 202 via one of the various available media utilizing one of the various network configurations, each one having a different level of susceptibility to cracking. Thus, client system 201 may access and mount filesystem 202 via a non-secure wireless network 227, or client system 201 may mount filesystem 202 utilizing a secure fiber-optic network 225. For simplicity of describing the invention, the wireless network 227 will be assume to be a standard, non-secure network without encryption, while the fiber-optic network 225 is assumed to be a special, secured connection with encryption. Each connection is routed via a different one of the ports available to the server 203 at which the mount of filesystem 202 is supported.

FIG. 1B illustrates a block diagram representation of filesystem 202 with a more detailed delineation of the files that comprise filesystem 202. As illustrated, filesystem 202 comprises a control block 131 and a plurality of files 132*a-n*, each of which includes a metadata tag 112 with header/identifier field 334 and security field 336. Header/ID field 334 contains information about the file ID and the users who have access to the file. Security field is a single bit field, which indicates the level of security attributable to that file and consequently the type of user-access permitted. According to the illustrative embodiment, certain files that require highest levels of security and which are restricted to being accessed solely on a secured mount (e.g., files 1 and 3) are tagged with "1" in the security field 336 of their respective metadata. Other files not so tagged (i.e., tagged with a 0) are normal (e.g., file 2) and may be access by any authorized user without a special secured mount.

As mentioned above, the invention introduces an enhanced security mechanism, which, in the illustrative embodiment, is referred to as DFNSE (Distributed Filesystem Network Security Extension). With DFNSE, the filesystem server is able to infer from the file permissions associated with a file or directory the level of network security that is required when providing access to the file by particular users. DFNSE is a server-level filesystem security enforcement application and/or procedure. Accordingly, with DFNSE, only the server is required to have knowledge of the networks connections or adapters being utilized by the server.

Figure 4:
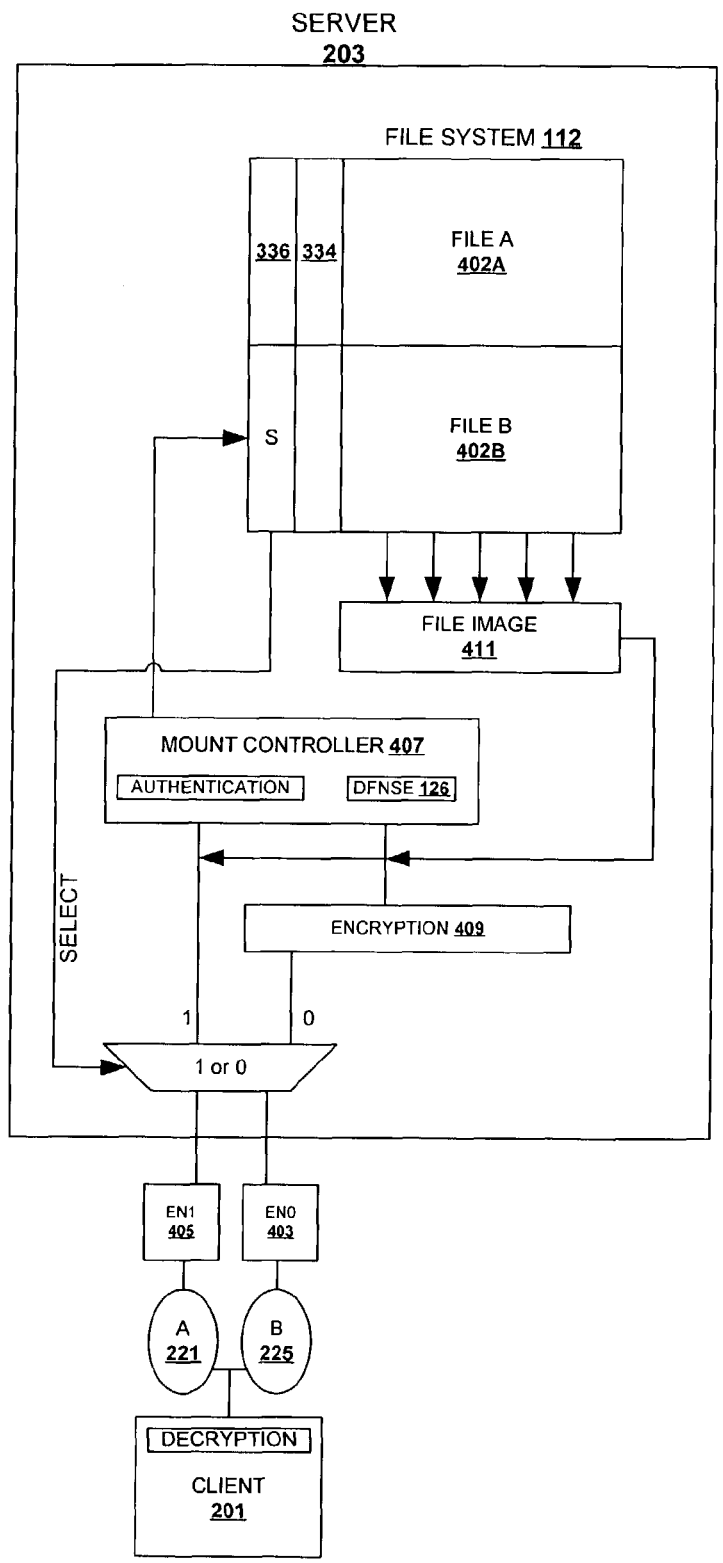
FIG. 4 is a block diagram illustrating logic components for seamlessly completing a switch of a client session on a filesystem from a standard, non-secured channel to a secured channel during a single continuing session in accordance with one embodiment of the invention.

Specific hardware, logic and software components are provided within each server capable of providing a mount to the filesystem to implement DFNSE. FIG. 4 is a block diagram illustrating some of these components. As illustrated in FIG. 4, server 203 may be provided with two Ethernet network adapters (or ports): en0 403, which is secure, and en1 405, which is not secure. In one embodiment, the network topology behind these adapters is consistent. That is, the sub-network selected itself provides the security and the server is able to dynamically select between sub-networks based on the level of security required. In another embodiment, additional encryption or other security features are provided with the secure adapter, en0 403.

En0 403 connects to a fiber network 225 that is utilized to route all sensitive data, while en1 405 connects to a standard Ethernet-based wired network 221 and is utilized for routing all other (non-sensitive) data communication. En1 405 is the default port for mounting the filesystem's server. The exemplary embodiment assumes that the ease at which the standard Ethernet can be breached without detection makes the Ethernet an unsafe option for routing sensitive data. During a mount of the filesystem, the server, which has detail knowledge of the file permissions 334 and security level 336 for each file tracks user access and determines when to force the client to switch over to the secure network based on the file permissions in place for the files being accessed. According to the illustrative embodiment, the network topology is consistent for both the secure and non-secure routes so that no additional hardware and/or routing protocol upgrades are required to account for different topologies during the switch from non-secured to secured sub-network.

Server 203 of FIG. 4 also includes a mount controller 407, which performs conventional mount support and unmount operations for filesystem 202 as well as re-mount configuration in accordance with the features of the present invention. Mount controller 407 includes DFNSE 126 and is preferably embodied as software code executing on server 203. DFNSE 126 operates to trigger mount controller 407 to route a request for a mount via either standard port, En1 405, or secured port, En0 403. Server 203 also includes encryption module 409 utilized in conjunction with DFNSE 126 and En0 403, when encryption is implemented on secured port.

During filesystem access, when a request for access to sensitive operation is received at server 203, mount controller 407 marks the client's IP address as one needing access to sensitive data. Server 203 then breaks the current connection, (i.e., the server sends a FYN to the client). The client automatically attempts to reconnect, and mount controller 407 recognizes the client IP address during the re-mount. The client's session is then directed to a secure SSL port. Thus, while primary access is provided via the standard port, access is dynamically switched to the SSL secure port when access to sensitive data/files is required.

Figure 3A:
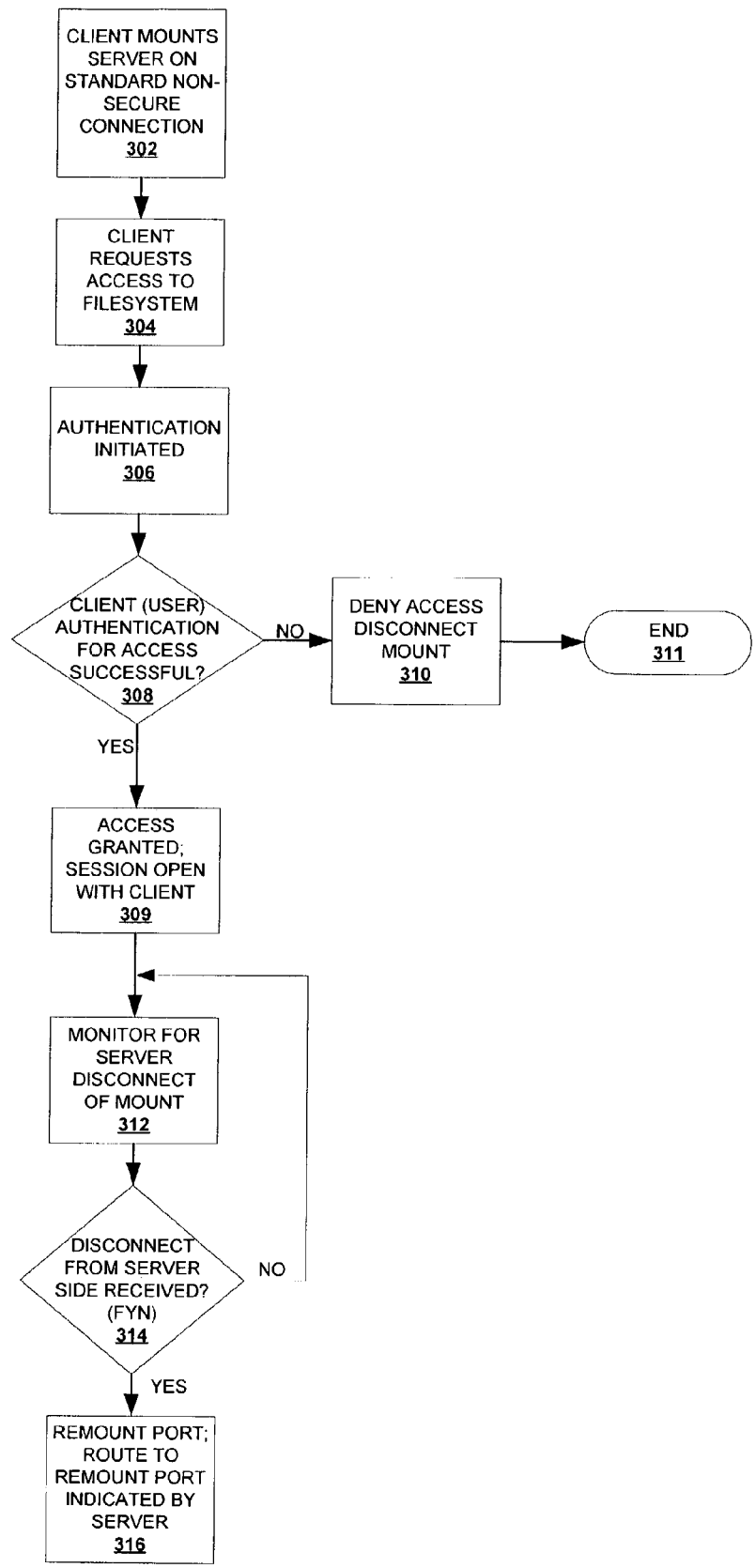
FIG. 3A is a flow chart of the process by which a client is provided access to sensitive files during access via a standard mount according to one embodiment of the invention.
Figure 3B:
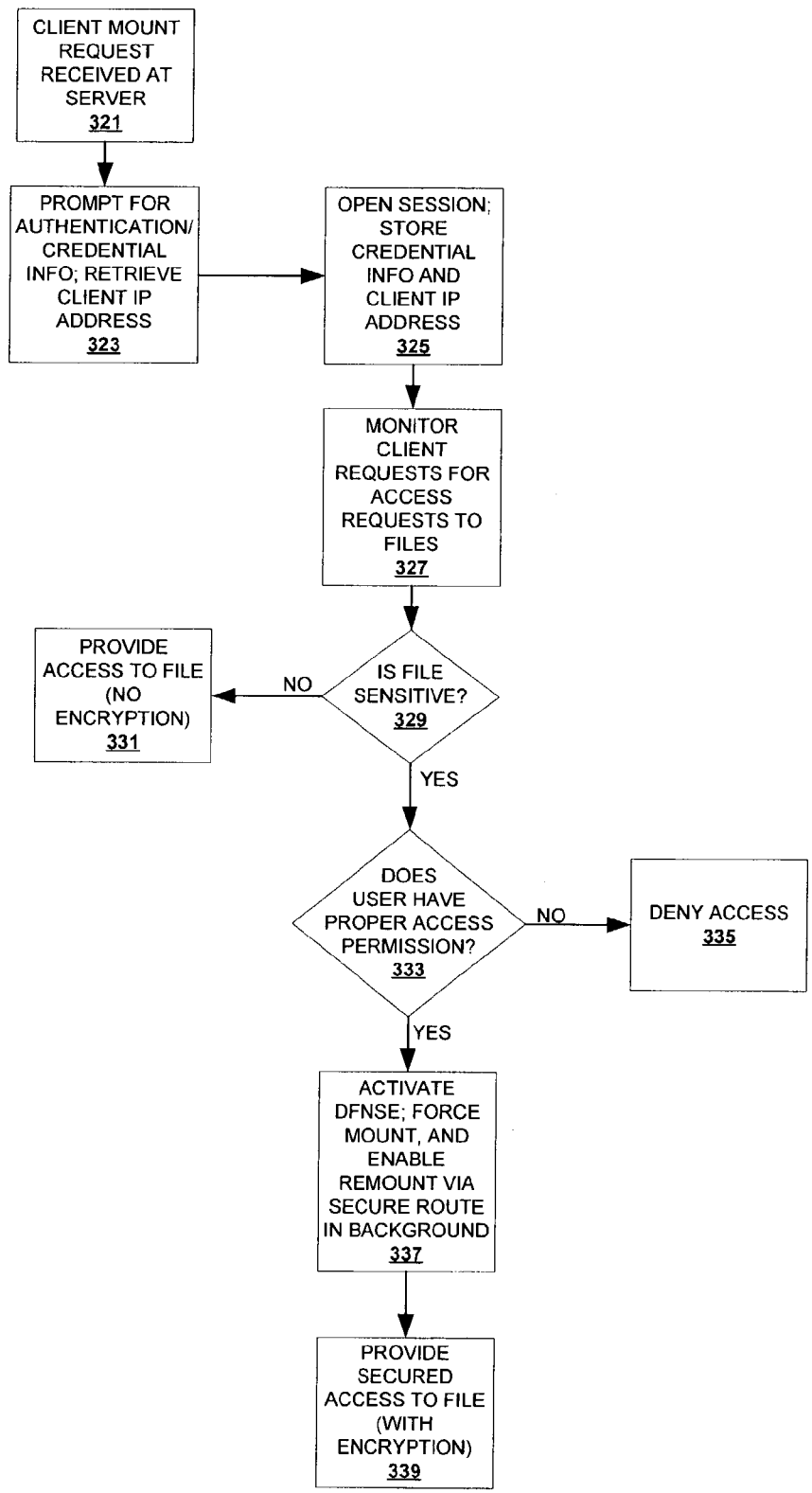
FIGS. 3B and 3C are flow charts of the processes by which a server monitors and controls client requests for access to sensitive files to ensure that access to those files is routed via a secure channel according to one embodiment of the invention.

Turning now to FIG. 3B, there is illustrated a flow chart of the process by which the software-implemented DFNSE security features are implemented within the above hardware/logic configuration of the server hosting the filesystem. The process begins with a standard mount request received at the standard port of the server from a client as shown at block 321. The user is prompted for authentication data (password, etc.) and the client system's IP address is retrieved from the data packet as indicated at block 323. A session is opened on the standard port and both the IP address and the user's authentication data are stored within a parameter file linked to the particular session as shown at block 325. Once the session is established, i.e., server logic associated with access permissions, etc., monitors the user's interaction as shown at block 327 and a determination made at block 329 whether the user is requesting access to a sensitive file.

The server that is satisfying a clients request for a file is programmed with the authorization/credentials of the user on the remote client and the permissions of the file being accessed. If the file being accessed is not sensitive, regular access is provided to the user on the standard port as shown at block 331. However, when the file being requested by the client is a sensitive file that requires a more secure channel before access can be granted, a next determination is made at block 333 whether the user has proper access permission to access the file. If the user does not have proper access permission the request is denied as shown at block 335. If, however, the user's credentials indicates the user has permission to access the particular file, the DFNSE security protocol is activated as shown at block 337. Activation of DFNSE causes the server to force an unmount of the client by issuing a FYN to the client and concurrently configuring a more secure port to accept the re-mount from the client having the IP address saved with the session parameters. The server then provides secured access to the file via the secured port as shown at block 339.

FIG. 3A is a flow chart of the processes involved in the implementation of the invention primarily from the perspective of the user/client system. The process begins when a user (via the client system) first mounts a server hosting the filesystem as illustrated at block 302 and requests access to the filesystem as shown at block 304. When the client initially mounts the NFS filesystem, the mount is completed over a standard TCP connection by default. For example, the connection may be to the well known NFS port of 2048. The server has a listening socket bound to this port and operates according to the standard (non-secure) protocol. Notably, in the illustrative embodiment, the standard protocol is enhanced by the DFNSE protocol, which is implemented when access to sensitive files are requested.

When a connection is requested from the client, the listening socket of the server basically duplicates itself and bounds the connection to the remote client. The listening socket then remains open to handle other connection requests. Authentication of the client is initiated as shown at block 306 and a determination made at block 308 whether the client's authentication was successful. If the client/user authentication process is un-successful, access to the filesystem is denied and the mount is disconnected as shown at block 310. Then the process ends as indicated at block 311. Otherwise, a session is opened and the user is provided access to the filesystem as shown at block 309.

The client system monitors the connection for disconnects as shown at block 312 and determines as indicated at block 314 whether the connection becomes un-responsive or is pre-maturely broken at the server side (i.e., ideally when a server issued FYN is received). When the connection becomes unresponsive or broken, the client initiates a re-mount that is routed to the port indicated by the server as shown at block 316.

Notably, re-connection in response to a server-initiated dismount is directed on a secure port at the server, although the actual port may be unknown to the client system. Utilizing the security protocols of DFNSE and based on the knowledge of which port is secure and whether the session requires a secure port, the server is able to request that the client re-mount over a secure port. For example, the client may be made to re-mount utilizing a port running Secure Socket Layer. Notably, no user-action is required to complete the re-mount and port-switching procedures. The monitoring for server-side unmount and subsequent re-mount all occur as background processes at the client system, and the user (client) is not made aware of the switch to a more secure port.

Figure 3C:
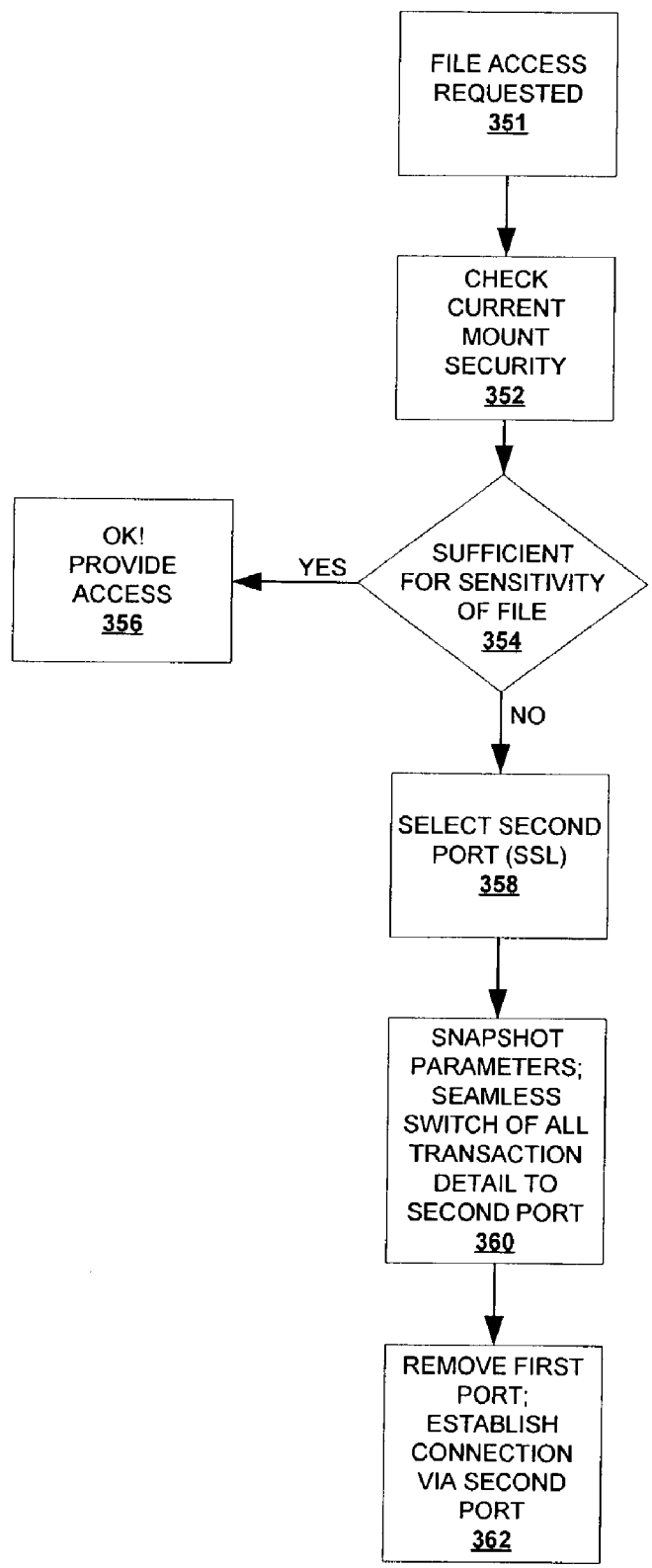

A more detailed account of the internal processing required for re-routing via a more secure port at the server side is illustrated by the flow chart of FIG. 3C. The process begins when access to a sensitive file is identified by DFNSE as shown at block 351. The server checks the current port security as indicated at block 352. A determination is made at block 354 whether the current port security is sufficient for accessing the requested file (depending on how sensitive the file is, which is deduced by reading the security bit of the file in the illustrative embodiment). If the current port security is sufficient for accessing the requested file, the access is provided as shown at block 356.

In one alternate embodiment, the remount function may be selectively automated and the process would require a next determination whether the feature for automatic remount is enabled. With this alternate embodiment, if the automatic remount capability is not enabled, the user will actually be prompted to remount via a secure mount.

Returning to the illustrated embodiment of FIG. 3C, when the port security is insufficient, the server responds by selecting a more secure port (e.g., En0) for the session as shown at block 358. The server takes a snapshot of the authentication and mount parameters of the session, including the client's IP address, and transfers these parameters to the control logic of the more secure port as depicted at block 360. The transfer occurs with very little latency and the more secure port is thus automatically configured to receive a re-mount from that client and continue supporting the session in progress. After the secure port has been configured, the corresponding port number is given to the mount controller along with the IP address of the client. The server terminates the mount on the first standard port and re-establishes the session via the more secure port when a re-mount is received from the client as shown at block 362.

Notably, in response to the server terminating the initial mount, the client initiates the re-mount which is directed by the user to the second, secured link. This re-establishes the initial session of the client but via the second port. Re-establishing the connection involves checking the clients IP address and matching it to the port that is set up to receive the connection from that IP address. The entire process occurs in the background and thus a seamless switching of ports is completed from the user's perspective.

In one alternate embodiment, the level of security attributable to a particular file is determined by the users (or selected client systems) that are provided access to the particular file. Thus, if file access permissions are restricted to filesystem administrators only, then the security level is high, while file access permission given to regular employees indicates a relatively low level of security required. Determination of the security level for a file is completed when the user initially creates the file and assigns the access permission to that file. Once the file is placed within the filesystem, the file automatically inherits the network security protection that is in place. With this implementation, existing file permissions on files within the filesystem (e.g., UNIX-rwx,rwx,rwx for user, group, other) fold into the security model provided herein without requiring extensive system administration and configuration. Thus, the present invention eliminates the need for re-configuring existing filesystems on a per file basis. With the invention, there is also no requirement to move sensitive files to a secure server.

While the invention has been particularly shown and described with reference to a preferred embodiment, it will be understood by those skilled in the art that various changes in form and detail may be made therein without departing from the spirit and scope of the invention. For example, although described with specific reference to NFS, the present invention is also applicable to DFS or AFS and other similar protocol.

What is claimed is:

1. In a data processing system comprising at least two different network adapters and a storage medium on which is stored at least a first file having a permission, a method for providing security for transmission of said first file, said method comprising:
    enabling an external client system to complete a first mount of said data processing system via a first standard/default network adapter, which provides a standard, non-secure access to the data processing system for all external client systems;
    enabling a second mount of said data processing system via a second, different, secure network adapter only when said first file requires secured access, wherein said second, different, secure network adapter is configured for access from the external client system by providing one or more session parameters associated with the first mount for use in completing the second mount;
    inferring said permission associated with said first file;
    responsive to receipt of a request for access to said first file by the external client system:
        when said permission of said first file indicates that said first file does not require secure transmission from the storage medium to the external client system, routing a transmission of the first file to the external client system via said first standard/default network adapter of the at least two different network adapters and via a respective first non-secure network connecting the external client system to the storage medium; and
        when said permission of said first file indicates secured transmission is required for transmitting said first file from the storage medium, dynamically routing the transmission of said first file to the external client system via said second, different, secure network adapter also connecting the external client system to the storage medium to enable secure transmission, wherein said dynamically routing step further comprises:
            automatically configuring said second, different, secure network adapter to support a remount operation in response to a mounting request from said external client system, wherein the remount operation enables the client system which was mounted on the data processing system via the first standard/default port over the first network to resume a session initiated at the first standard network adapter utilizing the second, different, secure network adapter and second secure network with stored session parameters from the first mount;
            terminating a current mount on said first standard/default network adapter with said external client system;
            storing session parameters of a session on said current mount to enable seamless continuation of said session on said second, different, secure network adapter; and
            enabling a re-mount of the data processing system by the external client system via the second secure network adapter and resumption of the session utilizing the session parameters stored; and
    wherein only certain files on the storage medium that have access permission requiring secure transmission of the files from the storage medium to any requesting external client system are transmitted from the storage medium to the external client system via the second, different, secure network adapter, while all other files on the storage medium that do not have access permission requiring secure transmission are automatically routed to the requesting external client system via the first standard/default network adapter.

2. The method of claim 1, wherein said data processing system further comprises an encryption module associated with said second, different, secured network adapter, said dynamically routing step comprising:
    first encrypting said first file by forwarding said first file to said encryption module; and
    when encryption of the first file by the encryption module is completed, forwarding an encrypted version of the first file to the second, different, secured network adapter to complete the dynamically routing to the external client system.

3. The method of claim 1, wherein said configuring and storing step includes:
    retrieving an IP address of said external client system;
    placing said IP address in a configuration of said second, different, secure network adapter; and
    responsive to detecting a mount operation at the second secure network adapter, comparing an IP address of the external client system executing the mount operation with an IP address in a configuration of the second, different, secure network adapter, wherein said second, different, secure network adapter automatically recognizes a mount operation from said external client system as a remount operation and re-establishes the session, which was previously established at the first standard/default network adapter, with said external client system.

4. The method of claim 1, wherein said permission is a bit within metadata linked to said first file and said method further comprises:
    tagging said bit to a value of one when the first file will require secure access via a secure network adapter and secure network;
    tagging said bit to a value of zero when the first file will not require secure access via a secure network adapter and secure network; and
    when a request to access the first file is detected from an external client system, reading a value of said bit to evaluate whether said first file requires secure access.

5. The method of claim 1, wherein a file includes an identification (ID) of which specific users are permitted to access said first file via a secured access, said method further comprising:
    comparing a user ID of said external client system with IDs of said specific users; and
    when said user ID matches one of the IDs of said specific users, automatically initiating a re-mount operation to route transmission of said first file to said external client system via said second, different, secure network adapter over said second secure network.

6. The method of claim 1, wherein said first standard network adapter connects to said external client system via a first unsecured network and said second, different, secure network adapter connects to said external client system via a second secured network.

7. The method of claim 1, wherein:
said data processing system is a server within a network having a first subnet connecting said first standard/default network adapter to said external client system and a second subnet connecting said second, different secure network adapter to said external client system;
said first file is stored within a filesystem which supports mounting at two different network adapters;
said checking step includes accessing said filesystem and locating said first file; and
said routing step includes transmitting said first file via said second subnet when said first file requires secure access and transmitting said first file via said first subnet when said first file does not require secure access.

8. A data processing system for providing security for transmission of selected, stored files, said system comprising:
(1) a storage medium on which is stored at least a first file having a permission;
(2) at least a first standard/default network adapter and a second, different, secure network adapter for connecting said data processing system to external client systems via corresponding networks;
(3) logic for selectively routing transmission of said at least one file via said first standard/default network adapter and said second, different, secure network adapter, said logic comprising:
logic for enabling a first mount of said data processing system via said first standard/default network adapter, which provides a standard, non-secure access to the data processing system for all external client systems;
logic for enabling a second mount of said data processing system via said second, different, secure network adapter only when said first file requires secured access, wherein said second, different, secure network adapter is configured for access from the external client system by providing one or more session parameters associated with the first mount for use in completing the second mount;
logic, for inferring said permission of said first file;
responsive to a request for access to said first file by an external client system:
when said permission of said first file indicates that said first file does not require secure transmission, logic for routing a transmission of the first file to the external client system via the first standard/default network adapter; and
when said permission of said first file indicates secured transmission is required for transmitting said first file from the storage medium, logic for dynamically routing the transmission of said first file to the external client system via said second, different, secure network adapter at which the external client system connects to the storage medium when secure transmission is required for a file, wherein said logic for dynamically routing further comprises:
logic for configuring said second, different, secure network adapter to support a remount operation in response to a mounting request received from said external client system;
logic for terminating a current mount on said first standard/default network adapter with said external client system;
logic for storing session parameters of a session on said current mount to enable seamless continuation of said session on said second, different, secure network adapter; and
logic for enabling a re-mount of the data processing system by the external client system via the second secure network adapter and resumption of the session utilizing the session parameters stored; and
wherein only files requiring secure transmission are transmitted from the storage medium via the second, different, secure network adapter.

9. The system of claim 8, wherein said data processing system further comprises an encryption module associated with said second, different, secured network adapter, said logic for dynamically routing comprising:
logic for first encrypting said first file utilizing said encryption module; and
when encryption of the first file by the encryption module is completed, logic for forwarding an encrypted version of the first file to the second, different, secured network adapter to complete the dynamically routing to the external client system.

10. The system of claim 8, wherein said configuring and storing logic includes:
logic for retrieving an IP address of said external client system; and
logic for placing said IP address in a configuration of said second, different, secure network adapter; and
responsive to detecting a mount operation at the second secure network adapter, logic for comparing an IP address of the external client system executing the mount operation with an IP address in a configuration of the second, different, secure network adapter, wherein said second, different, secure network adapter automatically recognizes a mount operation from said external client system as a remount operation and re-establishes the session, which was previously established at the first standard/default network adapter, with said external client system.

11. The system of claim 8, wherein said permission is a bit within metadata linked to said first file and said system further comprises:
logic for tagging said bit to a value of one when the first file will require secure access via a secure network adapter and secure network;
logic for tagging the bit to a value of zero when the first file will not require secure access via a secure network adapter and secure network; and
when a request to access the first file is detected from an external client system, logic for reading a value of said bit to evaluate whether said first file requires secure access.

12. The system of claim 8, wherein said permission includes an identification of which specific users are permitted to access said first file via a secured access, said system further comprising:
logic for comparing a user of said external client system with said specific users with said permission to access said file; and
when said user is one of said specific users, logic for automatically initiating a re-routing of a transmission of said first file via said second, different, secure network adapter.

13. The system of claim 8, wherein said first standard network adapter connects to said client system via a first unsecured network and said second, different, secure network adapter connects to said external client system via a second secured network.

14. The system of claim 8, wherein:
said data processing system is a server within a network having a first subnet connecting said first standard/default network adapter to said external client system and a second subnet connecting said second secure network adapter to said external client system;
said first file is stored within a filesystem;
said logic for checking includes means for accessing said filesystem and locating said first file; and
said logic for routing includes means for transmitting said first file via said second subnet when said first file requires secure access and transmitting said first file via said first subnet when said first file does not require secure access.

15. In a network comprising (1) a server hosting a filesystem and having at least a first standard/default network adapter and a second, different, secure network adapter, (2) a client, and (3) a plurality of transmission subnets for linking said server and said client, wherein said plurality of transmission subnets include a first standard subnet and a second secure subnet, a filesystem access control mechanism comprising:
a processor;
processing logic executing on the processor for scheduling and controlling transmission of files from the filesystem to the client, said processing logic including:
logic for inferring a permission of said first file;
logic for enabling a first mount of said server via said first standard/default network adapter, which provides a standard, non-secure access to the data processing system for all external client systems;
logic for enabling a second mount of said server via said second, different, secure network adapter only when said first file requires secured access;
responsive to a request for access to a first file by an external client system:
when said permission of said first file indicates that said first file does not require secure transmission, logic for routing a transmission of the first file to the external client system via the first standard/default network adapter and via said first standard subnet; and
when said permission of said first file indicates secured transmission is required for said first file, logic for dynamically routing the transmission of said first file to the external client system via said second, different, secure network adapter and via said second secure subnet, wherein said logic for dynamically routing further comprises:
logic for configuring said second, different, secure network adapter to support a remount operation in response to a mounting request received from said external client system;
logic for terminating a current mount on said first standard/default network adapter with said external client system;
logic for storing session parameters of a session on said current mount to enable seamless continuation of said session on said second, different, secure network adapter; and
logic for enabling a re-mount of the data processing system by the external client system via the second secure network adapter and resumption of the session utilizing the session parameters stored; and
wherein only files requiring secure transmission are transmitted from the filesystem via the second, different, secure network adapter and second secure subnet.

* * * * *